Oct. 1, 1963

C. R. FISHER, JR

SOLID-STATE TIME POSITION MULTIPLEXING
AND DEMULTIPLEXING SYSTEM 3,105,874

Filed Dec. 9, 1957

3 Sheets-Sheet 1

INVENTOR.
CHARLES R. FISHER, JR.

BY Richard G. Stahr
ATTORNEY

Oct. 1, 1963 C. R. FISHER, JR 3,105,874
SOLID-STATE TIME POSITION MULTIPLEXING
AND DEMULTIPLEXING SYSTEM

Filed Dec. 9, 1957 3 Sheets-Sheet 2

3,105,874
SOLID-STATE TIME POSITION MULTIPLEXING AND DEMULTIPLEXING SYSTEM

Charles R. Fisher, Jr., Rochester, N.Y., assignor to General Dynamics Corporation, Rochester, N.Y., a corporation of Delaware Filed Dec. 9, 1957, Ser. No. 701,445
8 Claims. (Cl. 178—50)

The present invention relates to binary bit time position multiplexing and demultiplexing systems, and, more particularly, to binary bit time division multiplexing and demultiplexing systems employing solid-state elements.

Prior art schemes for time division multiplexing binary information have used various arrangements of diodes and delay circuits.

All of these systems have been open to the objection of complexity and difficulty of maintenance in that large numbers of elements were required.

It is an object of this invention to provide a time division multiplexing system which will obviate the disadvantages of the prior art.

It is another object of this invention to provide a multiplexing device utilizing only solid-state elements.

It is another object of this invention to provide a demultiplexing device utilizing only solid-state elements.

It is another object of this invention to provide multiplexing and demultiplexing devices having a minimum of components and no moving parts.

In accordance with the system of this invention, the binary bits from a plurality of signal sources, each of which is individually coupled to respective members of a magnetic core matrix of a multiplexing device and assigned a time position, are time position multiplexed in a single output circuit which is common to all of the members of the magnetic core matrix, the appearance of a pulse or the absence of a pulse at each time position in the output circuit corresponding to input binary bits of one polarity or of another polarity, respectively, received from each respective signal source. The multiplexed binary bits are impressed upon a common input circuit which is coupled to all of the members of a magnetic core matrix similar to that of the multiplexing device and are demultiplexed in respective output circuits individual to each member of the matrix.

For a better understanding of the present invention, together with further objects and advantages, reference is made to the following description and accompanying drawings, in which.

By making maximum use of the ability of magnetic cores to "and" and "or" together two or more independent inputs, the devices of this invention provides a unique and extremely economical multiplexing system.

Figure 1:
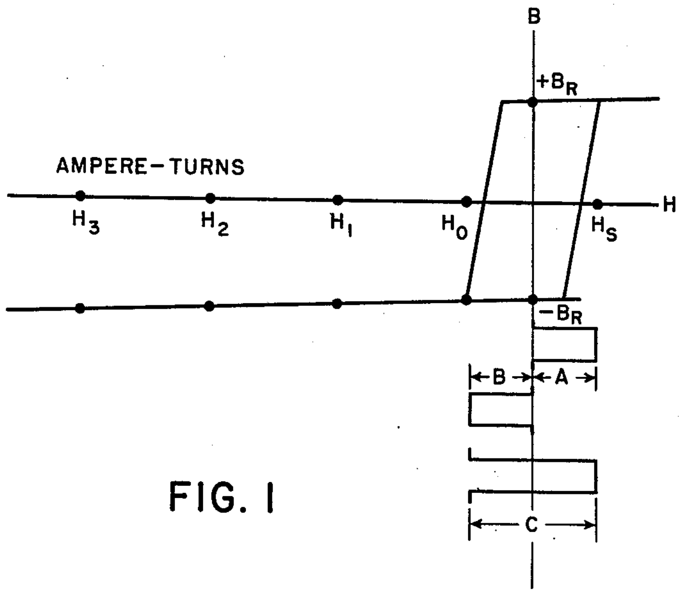
FIGURE 1 is a drawing of an ideal, substantially square hysteresis loop characteristic.

In FIGURE 1, there is shown the ideal square hysteresis loop characteristic of the magnetic members as used with the devices of this system. With the member in its normal state or first condition of saturation, the operating point is at $-B_r$. Upon the energization of a coil coupled to the member, by a coupling winding of one or more turns, by a current pulse of a polarity and magnitude to produce "A" ampere-turns, the condition of saturation of the member is reversed to its alternate or second condition, shifting the operating point to $+B_r$. Similarly, the energization of the same coil or of another coil coupled to the member, by a coupling winding of one or more turns, by a current pulse of a polarity and magnitude to produce "B" ampere-turns will now reverse the condition of saturation of the member to its normal or first condition and return the operating point to $-B_r$. As the condition of saturation of the member is reversed from either condition of saturation to the other, a pulse may be sensed in an output coil coupled thereto. If a separate coil is now coupled to the member by a coupling winding of one or more turns so that a direct current bias may be applied, the operating point of the member may be transferred to point $H_0$ by a direct current energizing current of a polarity and magnitude to produce "B" ampere-turns. From this operating point, therefore, a current pulse of a polarity and magnitude to produce "C" ampere-turns is required to reverse the condition of saturation of the member and, when this current pulse vanishes, the operating point returns to $H_0$. Therefore, if the direct current bias current is of a sufficient magnitude, the ampere-turns produced thereby may move the operating point of the member to $H_2$. It would then take the energy of one current pulse of a polarity and magnitude of "C" ampere-turns to return the operating point to $H_1$, thereby conditioning the member for a reversal of the condition of saturation and two more current pulses of a polarity and magnitude of "C" ampere-turns to reverse the condition of saturation of the member. This characteristic of alternate magnetic saturation in either one of two conditions by current pulses of opposite polarity energizing one or more coils coupled to the members with the production of an output pulse as the condition of saturation is reversed is employed in the device of the system of this invention in a manner to be hereinafter described.

Figure 2:
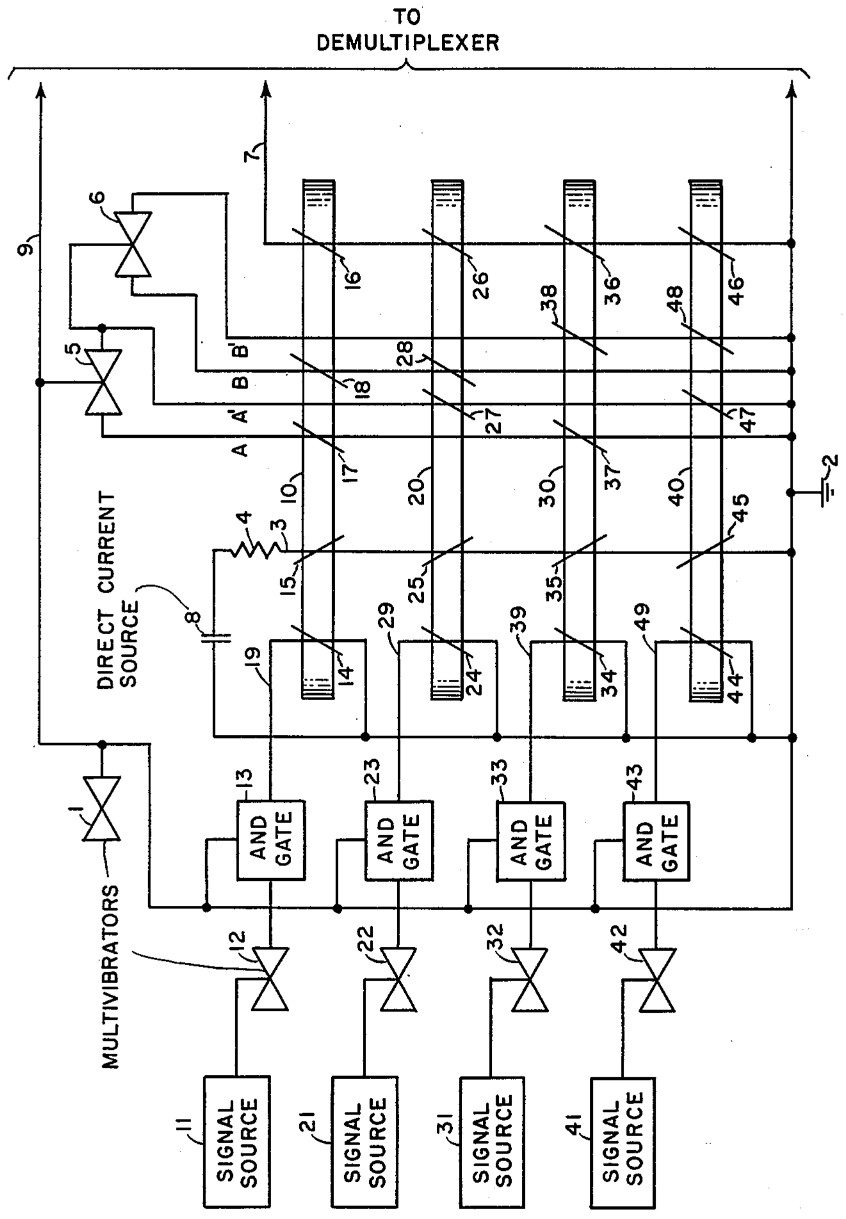
FIGURE 2 is a preferred embodiment of the multiplexing device of this invention.

In FIGURE 2 of the drawing there is shown a time position multiplexing device in accordance with this invention. A plurality of magnetic members, shown at 10, 20, 30 and 40, comprise a magnetic core matrix. While these members may be of any desirable form, a toroidal shape is perferred and, in the interest of drawing simplicity, have been shown schematically as elongated rectangles.

As has been brought out before hereinabove, each of the members of this matrix may be magnetically saturated in either one of two conditions of saturation through the energization of coils coupled thereto. For purposes of this specification, the first and second conditions of saturation of the members will be referred to as the "P" and "N" conditions of saturation, respectively. In the interest of drawing simplification, the windings which couple the various coils to the members have been indicated as short, straight, diagonal lines which form an acute angle with the members, the direction of the acute angle denoting "P" or "N" sense windings. An acute angle to the left indicates an "N" sense winding while an acuate angle to the right indicates a "P" sense winding. For purposes of clearly illustrating the magnetic characteristics of the members used in the device of this invention, it has hereinbefore been explained that to reverse the condition of saturation of the members requires enregizing current pulses of opposite polarity. It should be noted at this time that the actual polarity of the energizing current pulses a significant only to the extent that the polarity be known in that energizing current of the same polarity may produce either the "P" or the "N" condition of saturation depending upon the physical direction of the coupling winding turns which they energize. It is of utmost importance, however, that for energizing pulses of either polarity, the physical direction of the coupling winding turns which they energize be such as to produce the "P" condition or the "N" condition of saturation, whichever may be required, as determined by the application. For this reason, then, the representative diagonal lines indicate only the sense of the coupling winding turns for producing either the "P" or the "N" condition of saturation in respect to the polarity of their energizing current pulses but do not necessarily indicate the physical direction of the coupling winding turns.

Also for purposes of drawing clarity and simplicity, the various coils herein referred to have been indicated as straight, vertical lines, each of which intersects one or more of the diagonal coupling coil representative lines and are comprised of the associated coupling windings connected in series.

Also indicated are a number of respective signal sources shown at 11, 21, 31 and 41. As these signal sources form no part of the invention and may be any device from which binary signals may originate, they have been illustrated in the drawing in block form. Each of these signal sources is assigned a time position and each is assigned a single magnetic member of the magnetic core matrix. In this instance, therefore, four signal sources will require four different time positions and a device having four magnetic members in the matrix. While only four signal sources and, consequently, four magnetic members have been herein illustrated, it is to be specifically understood that more or less signal sources may be multiplexed by this device through the use of correspondingly more or less magnetic members and time positions.

A common output coil 7 is coupled to each of the magnetic members of this device through respective coupling windings 16, 26, 36 and 46. One end of this coil may be connected to a point of fixed potential indicated at 2. An output pulse will appear in this output coil as the condition of saturation of any of the respective magnetic members is reversed. The time division multiplexed binary bits from the signal sources, therefore, will appear in the output circuit as the presence of a pulse or the absence of a pulse at each assigned time position for an input binary bit of one polarity or of another polarity, respectively. For the purposes of this specification, and in no way intending or inferring to be limited thereto, the presence of a pulse in the output circuit will correspond to a "mark" bit while the absence of a pulse in the output circuit will correspond to a "space" bit.

To bias all of the members to the operating point indicated at $H_2$, FIGURE 1, a common direct current bias coil 3, which consists of series-connected coupling windings 15, 25, 35 and 45, each of which is wound upon a respective magnetic member, is provided. For purposes of this specification, and in no way intending to be limited thereto, the bias coupling windings have been herein indicated to be of a sense which, when energized, will bias the respective members to their "N" condition of saturation as they form acute angles to the left. These respective coupling windings are energized by direct current source 8, through current limiting resistor 4. By adjusting this direct current bias current to a sufficient magnitude, sufficient ampere-turns may be produced to establish the operating point of the members at point $H_2$, FIGURE 1, thereby requiring the ampere-turns of three simultaneous opposite sense pulses in addition to reverse the condition of saturation of the respective members.

To provide a pulse for each time position, a free-running multivibrator, indicated at 1, may be employed. As this multivibrator may be of any conventional design, it will not be described in detail in this specification. This multivibrator may be replaced by any pulse source in that its function is to serve as a master timing device, producing the required time positions in a manner as will be hereinafter described.

Since, as has been brought out before, the simultaneous addition of the ampere-turns of three current pulses are required to reverse the condition of saturation of the respective members, thereby producing a pulse in the output coil 7, upon the receipt of a "mark" bit from the respective signal sources, the received "mark" bit must condition the respective members for a reversal of the condition of saturation. An individual input coil, indicated at 19, 29, 39 and 49, is coupled to each magnetic member by respective input coupling windings 14, 24, 34 and 44. It should be noted that the sense of the respective coupling windings are in an opposite sense relation to the bias coupling windings. As has been brought out before, the appearance of a pulse in the output circuit at any time position corresponds to a "mark" bit from the signal source assigned to that time position and the absence of a pulse in the output circuit at any time position corresponds to a "space" bit from the signal source assigned to that time position. Since it requires the ampere turns of three simultaneous current pulses to overcome the direct current bias to reverse the condition of saturation of any member, thereby producing an output pulse, the "mark" bits from any source must energize the respective input coupling windings in an opposite sense relation to the direct current bias thereby conditioning the respective member for a reversal of its condition of saturation while the "space" bits from any source must be ineffective to energize the respective input coupling windings. Connected to each input coil, therefore, is the output circuit of a respective "and" gate indicated at 13, 23, 33 and 43. As these gates are conventional in their design and form no part of this invention, they will not be described in detail except to note that to produce a pulse in the output of each gate there must be two input pulses. One of these input pulses is supplied by time position pulse source multivibrator 1, the output of which is connected to the first input of each gate, in parallel, as shown, while the second gate input pulse is produced by the respective "mark" bits. Inserted between the respective gates and signal sources is a bistable multivibrator indicated by reference numerals 12, 22, 32 and 42. An output circuit from the right side of each of these bistable multivibrators is connected to the second input circuit of the respective gates, as shown. In their normal condition, the left side of all the bistable multivibrators is conducting, which results in the absence of a pulse to the second input circuit of the respective gates. The receipt of a "mark" bit triggers the associated bistable multivibrator, causing the right side to become conductive, thereby producing an energizing current pulse which is connected to the second input circuit of the associated gate. As the time position pulses are impressed upon the first input of the respective gates, a corresponding pulse is produced in the output circuit of all gates which have both input circuits energized. The receipt of a "space" bit will trigger the associated bistable multivibrator to its alternate condition, thereby causing the left side to become conducting. As the respective gate circuits are not connected to the left side of the associated bistable multivibrators, the second input circuit of the gates are not energized, hence, there is no output pulse to energize the respective input coupling windings. In this manner, therefore, "mark" bits are effective to energize the respective input coupling windings, thereby conditioning the respective magnetic members for a reversal of their condition of saturation, while the "space" bits are ineffective to energize the respective input windings.

The purpose of the bistable multivibrators is to produce a relatively strong energizing current pulse upon the receipt of a "mark" bit as the received bits are relatively weak and may not be of sufficient magnitude to energize the input windings and also to maintain the energizing current pulse through all time positions. Although an amplifier may be used for this purpose, the multivibrator is preferred in that small magnitude pulses are being considered and random noises which may appear on the transmission line with a "space" bit, when amplified, may be of sufficient magnitude to produce an output from the respective gate circuits, thereby producing a false "mark" indication. With the multivibrator, random noises would not be of sufficient magnitude to trigger it, therefore, with a "space" bit there would be no input to the respective gate circuits.

As the appearance of a pulse in the output circuit at the time position assigned any signal source corresponds to a "mark" bit from that source, the respective members which have been so conditioned by an input "mark" bit must have their condition of saturation reversed at the proper time position. Since the ampere-turns produced by three simultaneous current pulses are reuired to do this, each member must have coupled thereto two additional energizing coils, both of which are energized at only that time position assigned to the signal source associated with that member. A pair of conventional bistable multivibrators connected as a binary divider may be used to produce these additional energizing pulses and are shown at 5 and 6. Time position pulse source multivibrator 1 drives the first bistable multivibrator 5, while the output from the right side of multivibrtor 5 drives bistable multivibrator 6. The energizing coils which are connected to the output of each side of the respective bistable multivibrators are labeled "A" and "A′" for multivbrator 5 and "B" and "B′" for multivibrator 6. As the left side of each bistable multivibrator 5 and 6 is conducting, an energizing current pulse flows through coils A and B, respectively, and, as the right side of each bistable multivibrator is conducting, an energizing current pulse flows through coils A′ and B′, respectively. In each instance, therefore, as an energizing current pulse flows in either coil of each coil pair, there is no energizing pulse in the other coil of the same coil pair. As time position pulse multivibrator 1 produces output pulses, the right and left sides of bistable multivibrator 5 are alternately triggered to conduction with each pulse, thereby producing an energizing current pulse in coil A with the first, third, fifth, etc., pulse of time position pulse source multivibrator 1 and an energizing current pulse in coil A′ with the second, fourth, sixth, etc., pulse of time position pulse source 1. Each time the right side of multivibrator 5 is extinguished, an output pulse is produced which triggers multivibrator 6. Therefore, an energizing current pulse is produced in coil B with the first and second pulses of time position pulse source multivibrator 1 and in coil B′ with the third and fourth pulses of time position pulse source multivibrator 1. In this manner, there is thus produced by multivibrators 5 and 6 a plurality of what may best be described as alternating pulse pairs in coils A and A′ and B and B′, the pulse frequency of each succeeding pair, B and B′, being half that of the preceding pair, A and A′.

Figure 4:
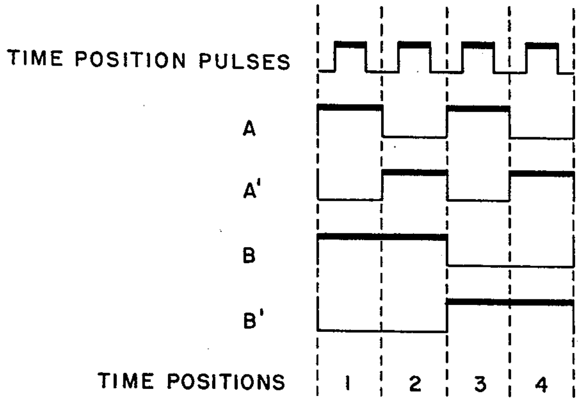

FIGURE 4 more clearly illustrates the energizing current flow relationships in each coil A, A′, B and B′ with each time position pulse.

From the two alternating pulse pairs there are available four different combinations of one current pulse from each pair, A and B, A′ and B, A and B′ and A′ and B′. From FIGURE 4, it may be seen that an energizing current pulse appears in all of the coils of each combustion, in this instance two, at a time position different from all other combinations. Coils A and B are both energized in the first time position, coils A′ and B in the second time position, coils A and B′ in the third time position, and coils A′ and B′ in the fourth time position. Assuming that the signal sources associated with magnetic members 10, 20, 30 and 40, respectively, have been assigned time positions 1, 2, 3 and 4, respectively, coils A and B are coupled to magnetic member 10 by coupling windings 17 and 18, respectively, coils A′ and B are coupled to magnetic member 20 by coupling windings 27 and 28, respectively, coils A and B′ are coupled to magnetic member 30 by coupling windings 37 and 38, respectively, and coils A′ and B′ are coupled to magnetic member 40 by respective coupling windings 47 and 48.

Therefore, by means of coils A, A′, B and B′ and their associated coupling windings 17 and 37, 27 and 47, 18 and 28, and 38 and 48, respectively, a different combination of one current pulse from each of the alternating pulse pairs is individually coupled to each of the magnetic members in a manner that all of the coupling windings of each combination are thereby energized at a time position different from all other combinations.

The sense of these coupling coils are opposite those of the bias coupling coils as indicated by straight lines making acute angles to the left. Therefore, whether any of the magnetic members condition of saturation is reversed or not as the different combinations are energized in each time position is dependent upon the presence of an energizing pulse in the respective input coupling winding. Any of the magnetic members which are assigned to a signal source which is transmitting a "space" bit in its assigned time position will not have its condition of saturation reversed in that the operating point of that member is raised to only point $H_0$, FIGURE 1, through the ampere-turns produced by the energization of the coupling windings by any combination of alternating pulse pairs; whereas, any member which has been asisgned to a signal source which is transmitting a "mark" bit will have its condition of saturation reversed in that an input "mark" bit produces an energizing pulse in the associated input coupling winding in a manner as has been described before. The ampere-turns produced by this "mark" bit energizing pulse elevates the operating point of that member to point $H_s$, FIGURE 1, thereby reversing the condition of saturation of that member, producing an output pulse at that time position in the common output circuit.

In this manner, then, the bits of a binary code are time division multiplexed by the device of this invention and appear in a common output circuit from which they may be demultiplexed by another device of this system.

Figure 3:
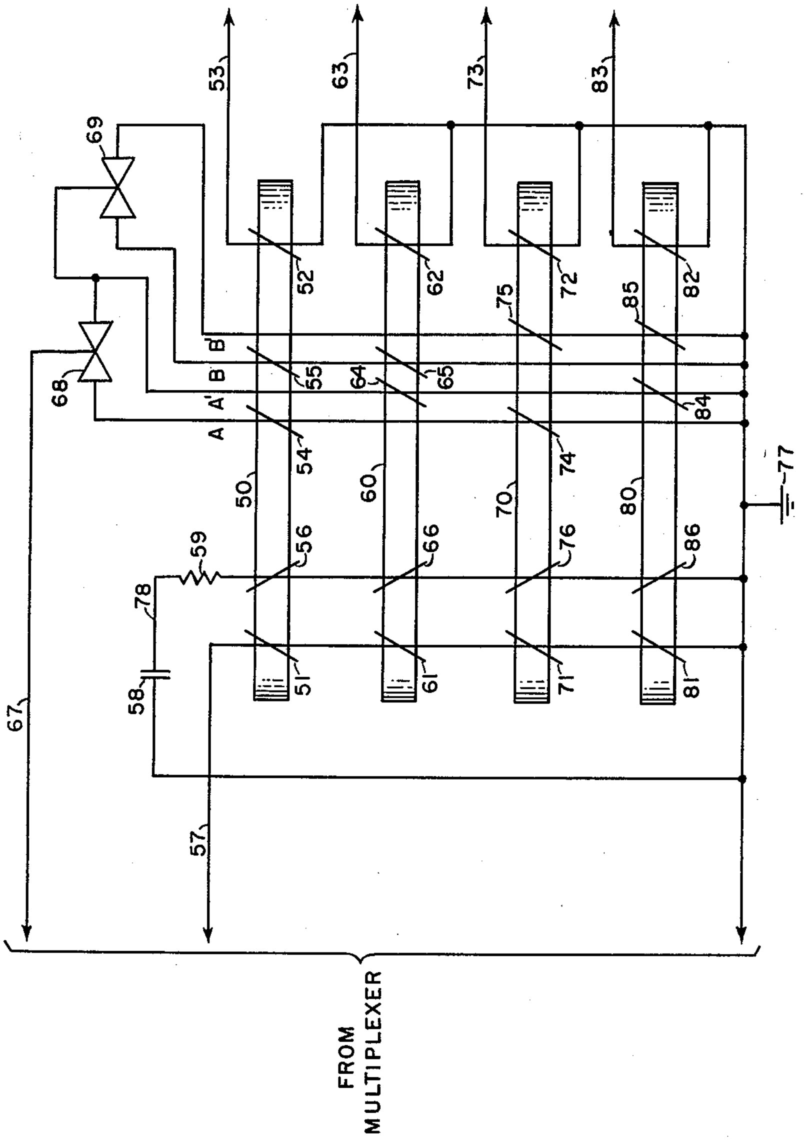
FIGURE 3 is a preferred embodiment of the demultiplexing device of this invention; and, FIGURE 4 is the schematic indication of current relationships in certain coils of these devices.

In FIGURE 3 is shown the demultiplexing device of this invention which operates in a manner similar to the multiplexing device but in the opposite direction. A plurality of magnetic members shown at 50, 60, 70 and 80 comprise a magnetic core matrix similar to that used in the multiplexing device. While these members may be of any desirable form, a toroidal shape is preferred and, in the interest of drawing simplicity, they are also shown schematically as elongated rectangles. Each of these magnetic members have a relatively square hysteresis loop characteristics as has the members used in the multiplexing device and shown in FIGURE 1. As in the case of the multiplexing device, each of the members of the demultiplexing device has assigned to it one of the signal sources of FIGURE 2. For purposes of this specification, and in no way intending to be limited thereto, it will be assumed that members 50, 60, 70 and 80 have been assigned to signal sources 11, 21, 31 and 41, respectively.

Individual output coils shown at 53, 63, 73 and 83 are individually coupled to respective magnetic members by coupling windings 52, 62, 72 and 82, respectively. One end of each of these coils may be connected to a source of reference potential shown at 77. To produce an output pulse in any of the respective indvidual output coils, the condition of saturation of the magnetic member to which it is coupled must be reversed. This reversal of the condition of saturation is accomplished in much the same manner as has previously been explained in connection with the multiplexing device.

To bias all of the members to the operating point indicated at $H_2$, FIGURE 1, a common direct current bias coil 78, which consists of series connecting coupling windings 56, 66, 76 and 86, each of which is wound upon a respective magnetic member, is provided. For purposes of drawing simplification, this bias coil and coupling windings are schematically indicated in the same manner as previously described in regard to the multiplexing device. These respective coupling windings aer energized by direct current source 58, through current limiting resistor 59. By adjusting this direct current bias to a sufficient magnitude, sufficient ampere-turns may be produced to establish the operating point of the member at point $H_2$, FIGURE 1, thereby requiring the ampere-turns of three simultaneous opposite sense pulses in addition to reverse the condition of saturation of the respective members. To condition all of the members for a reversal of the condition of saturation, a common input coil 57, which consists of series coupling windings 51, 61, 71 and 81, each of which is wound upon a respective member in a sense opposite to that of the bias coil coupling windings, is provided.

The time division multiplexed signals which appear in output coil 7, FIGURE 2, of the multiplexing device also appear in input coil 57, FIGURE 3, of the demultiplexing device in that these coils are electrically connected. The appearance of a pulse, in this specification indicating a "mark" bit, at any time position in input coil 57 will condition all of the magnetic members for a reversal of their condition of saturation at that time position. To reverse the condition of saturation, however, the ampere-turns produced by three simultaneous pulses in addition are required as has been previously described, therefore, the ampere-turns produced by the input pulses are insufficient to cause this reversal.

To properly demultiplex the time division multiplex signals appearing in input coil 57, the condition of saturation of the magnetic members which have been assigned to the time positions at which a "mark" pulse may appear must be reversed at that time position by the ampere-turns produced through the energization of two additional coils coupled thereto by an additional two current pulses, thereby producing a pulse in the respective output circuits. For instance, the ampere-turns produced by the energization of the input coupling windings by a "mark" pulse appearing in the first time position will condition all of the magnetic members of the demultiplexing device for a reversal of their condition of saturation. Since, for purposes of this specification, magnetic member 50 has been chosen to be assigned to signal source 11 which has been assigned the first time position, the condition of saturation of magnetic member 50 only must be reversed at this time position, by the ampere-turns produced through the energization of two additional coils coupled thereto by two additional current pulses, so that an output pulse, corresponding to a "mark" bit emanating from signal source 11, will appear in output coil 53.

To provide these two additional current pulses which energize the two additional coils coupled to each of the members at different time positions, a binary divider device comprising multivibrators 68 and 69 is employed. This binary divider device produces a plurality of alternating current pulse pairs in coils A and A' and B and B', the frequency of each succeeding pair, B and B', being half that of the preceding pair, A and A', in the same manner as has been described in connection with the binary divider scheme as used with the multiplexing device. As these multivibrators are also driven by time position pulse source multivibrator 1, FIGURE 2, through output circuit 9 of FIGURE 2 and input circuit 67 of FIGURE 3, which are electrically interconnected, the energizing current pulse relationships in each coils A, A', B and B' with each time position pulse is the same as that shown in FIGURE 4.

From the two alternating pulse pairs there is available four different combinations of one pulse from each pair, A and B, A' and B, A and B' and A' and B'. From FIGURE 4, it may be seen that an energizing current pulse appears in all of the coils of each combination, in this instance two, at a time position different from all other combinations. Coils A and B are both energized in the first time position, coils A' and B in the second time position, coils A and B' in the third time position, and coils A' and B' in the fourth time position. Assuming that the signal sources associated with magnetic members 50, 60, 70 and 80, respectively, have been assigned time positions 1, 2, 3 and 4, respectively, coils A and B are coupled to magnetic member 50 by coupling windings 54 and 55, respectively, coils A' and B are coupled to magnetic member 60 by coupling windings 64 and 65, respectively, coils A and B' are coupled to magnetic member 70 by coupling windings 74 and 75, respectively, and coils A' and B' are coupled to magnetic member 80 by respective coupling windings 84 and 85.

Therefore, by means of coils A, A', B and B' and their associated coupling windings 54 and 74, 64 and 84, 55 and 65, and 75 and 85, respectively, a different combination of one pulse from each of the alternating pulse pairs is individually coupled to each of the magnetic members in a manner that all of the coupling windings of each combination are thereby energized at a time position different from all other combinations.

The sense of these coupling windings are opposite those of the bias coupling coils; therefore, any of the magnetic members' condition of saturation may be reversed in its time position with the presence of a pulse in the input coil 57 thereby producing a pulse in the respective output coil.

Although this specification has described the use of a binary divider with each the multiplexing and demultiplexing devices of this invention to produce the required alternating pulse pairs, it is to be understood that with installations in which the requirements permit, the required pulse pairs for both devices may be produced by a single pulse pair source. For instance, the A, A', B and B' coils of FIGURE 2 may be extended to FIGURE 3 and coupled to the respective members 50, 60, 70 and 80 as shown.

In this manner, then, the time division multiplex signals appearing in coil 57 are demultiplexed by the demultiplexing device of this invention and appear in individual output circuits corresponding to the signal source from which they originated.

While this device has been described on the basis of one polarity, it is to be understood that all of the respective polarities may be reversed without altering the end result of this multiplexing system.

The respective devices have also been described on the basis of serial transmission of information. They may also be used with the parallel transmission of information, that is, the respective binary bits from each signal source may be time division multiplexed in parallel through the parallel combination of a multiplexing and demultiplexing device of this invention for each bit of the binary code which is being used. In this type system, each device time division multiplexes and demultiplexes respective binary bits from a plurality of signal sources.

It is apparent from this specification that the devices of this invention are substantially identical structurally and, therefore, may be operated in one direction to multiplex binary signals and in the opposite direction to demultiplex binary signals which have been multiplexed. By connecting the outputs of the respective gate circuits 13, 23, 33 and 43, FIGURE 2, to the "output" circuit coils 53, 63, 73 and 83, FIGURE 3, time division multiplexed binary information will appear in common "input" coil 57 of FIGURE 3. Similarly, by connecting time division multiplexed binary information to the common "output" coil 7, FIGURE 2, demultiplexed binary information will appear in individual "input" circuits 19, 29, 39 and 40 of FIGURE 2. The foregoing being true, of course, if the devices are operated in a manner similar to that herein described.

While a preferred embodiment of this invention has been shown and described, it will be obvious to those skilled in the art that more or less signal sources may be time division multiplexed by this system through the use of corresponding more or less magnetic members, time positions, and alternating pulse pairs in each the multiplexing and demultiplexing devices, and that various other modifications and substitutions may be made without departing from the spirit of this invention which is to be limited only within the scope of the appended claims.

What is claimed is:

1. In a time position multiplexing device, a given number of magnetic members each of which is capable of being magnetically saturated in either a first or second condition of saturation, means for applying a direct current in cooperative relationship with all of said magnetic members to normally maintain all said magnetic members in said first condition of saturation thereof, a pulse source for sequentially producing pulses, a pulse counter coupled to said pulse source for cyclically counting the pulses sequentially applied thereto up to a number equal to said given number, said pulse counter producing a signal output manifesting the count registered thereby, means for applying said signal output in cooperative relationship with said magnetic members, said signal output including a first signal having a magnitude and polarity tending but insufficient by itself to switch a selected one of said magnetic members from said first to said second condition of saturation thereof, said selected one of said magnetic members being determined by the count registered by said pulse counter, means for applying a second signal in cooperative relationship with each of said magnetic members, said second signal having a magnitude and polarity tending but insufficient by itself to switch a magnetic member to which it is applied from said first to second condition of saturation thereof, but the concurrent application of both said first and second signals to a magnetic member being sufficient to effect the switching of that magnetic member from said first to second condition of saturation thereof, whereby only a selected one of said magnetic members may be switched to said second condition of saturation thereof.

2. The device defined in claim 1, wherein said pulse counter produces a signal output manifesting in binary code the count registered thereby.

3. The device defined in claim 1, wherein said pulse counter includes a chain of bistable multivibrators each of which produces first and second separate outputs of opposite polarity with respect to a point of reference potential, means for applying pulses from said pulse source as an input to a first of said multivibrators to effect a reversal in the polarity of the outputs thereof in response to each pulse, and means for applying one of the outputs of each of said multivibrators in said chain as an input to the next succeeding multivibrator in said chain to effect a reversal in the polarity of the outputs of the next succeeding multivibrator in the chain in response to a reversal in polarity in a given direction of the applied one of the outputs of the preceding multivibrator in the chain, whereby the combination of polarities appearing on the respective outputs of the multivibrators manifests the count registered thereby, wherein said means for applying said signal output in cooperative relationship with said magnetic members includes means for applying each output of each multivibrator to a different combination of predetermined magnetic members chosen to provide that for each combination of polarities only a selected one of said magnetic members has all multivibrator outputs applied thereto of the same given polarity, said given polarity being that polarity which tends to switch said magnetic members from said first to said second condition of saturation thereof, said selected one of said magnetic members differing for each particular combination of polarities, and wherein the respective magnitudes of said multivibrator outputs and said second signal are such that a magnetic member may be switched from said first to said second condition of saturation thereof only in response to all said multivibrator outputs applied thereto having said given polarity and said second signal also being applied thereto.

4. The device defined in claim 1, wherein said means for applying said second signal in cooperative relationship with each of said magnetic members includes means responsive to mark-type and space-type pulses applied thereto associated with each of said magnetic members, and means coupling each means responsive to mark-type and space-type pulses and said pulse source to its associated magnetic member for applying said second signal thereto only in response to simultaneous presence of a pulse from said pulse source and one type pulse from said means responsive to mark-type and space-type pulses.

5. The device defined in claim 4, wherein said means responsive to mark-type and space-type pulses applied thereto includes a bistable multivibrator producing a first output in response to a mark-type pulse applied thereto and a second output in response to a space-type pulse applied thereto, and wherein said coupling means includes an AND circuit for producing said second signal in response to the application thereto of a pulse from said pulse source and a particular one of the outputs of said multivibrator.

6. The device defined in claim 5, further including means interconnected to all said magnetic members for inducing a signal therein in response to any of said magnetic members being switched from said first to said second condition of saturation thereof.

7. The device defined in claim 1, wherein said second signal is composed of multiplexed pulses applied to all said magnetic members, each of said multiplexed pulses occurring isochronously with a pulse from said pulse source.

8. The device defined in claim 7, further including means individually connected to each of said magnetic members for inducing a signal therein in response to that magnetic member to which it is individually connected being switched from said first to said second condition of saturation thereof.

References Cited in the file of this patent

UNITED STATES PATENTS

| | | |
|---|---|---|
| 1,606,937 | Harrison | Nov. 16, 1926 |
| 1,900,954 | Sandeman | Mar. 14, 1933 |
| 2,247,909 | Doty | July 1, 1941 |
| 2,609,451 | Hansen | Sept. 2, 1952 |
| 2,734,182 | Rajchman | Feb. 7, 1956 |
| 2,776,419 | Rajchman et al. | Jan. 1, 1957 |
| 2,928,894 | Rajchman | Mar. 15, 1960 |
| 2,964,737 | Christopherson | Dec. 13, 1960 |